United States Patent [19]

Amon

[11] Patent Number: 5,520,124
[45] Date of Patent: May 28, 1996

[54] METHOD FOR DISPOSING OF PAPER IN AN ASPHALT PLANT

[76] Inventor: Thomas R. Amon, 219 Sunset Dr., Elkhorn, Wis. 53121

[21] Appl. No.: 371,161

[22] Filed: Jan. 11, 1995

[51] Int. Cl.⁶ .................................................. A47J 36/00
[52] U.S. Cl. .................... 110/246; 110/261; 110/346; 110/347; 366/25
[58] Field of Search .................................. 110/260, 261, 110/263, 264, 265, 232, 238, 246, 347; 366/22, 23, 24, 25, 30, 3, 4

[56] References Cited

U.S. PATENT DOCUMENTS

| | | | |
|---|---|---|---|
| 4,253,405 | 3/1991 | Cottrell et al. | 110/244 |
| 5,018,459 | 5/1991 | Judd | 110/246 |
| 5,054,406 | 10/1991 | Judd | 110/346 |
| 5,090,813 | 2/1992 | McFarland et al. . | |
| 5,176,445 | 1/1993 | Mize . | |
| 5,178,456 | 1/1993 | Marconnet . | |
| 5,257,587 | 11/1993 | Ohlsen et al. . | |
| 5,273,355 | 12/1993 | May et al. . | |
| 5,297,957 | 3/1994 | Brashears | 432/14 |
| 5,342,442 | 8/1994 | Nechvatal et al. | 106/409 |
| 5,392,721 | 2/1995 | Judd | 110/246 |

FOREIGN PATENT DOCUMENTS

| | | | |
|---|---|---|---|
| 2242005 | 9/1990 | Japan | 110/244 |
| 1384474 | 2/1975 | United Kingdom | 110/244 |

*Primary Examiner*—Thomas E. Denion
*Attorney, Agent, or Firm*—Michael, Best, & Friedrich

[57] ABSTRACT

A method for disposing of paper in an asphalt plant, comprising the steps of: a) providing a container for heating stone aggregate, providing in the container a burner for producing a flame to provide thermal energy for heating the stone aggregate in the container; b) providing a stream of air into the burner flame; c) introducing the paper into the stream of air, such that the paper is entrained in the stream of air, such that the stream of air having therein the entrained paper is introduced into the burner flame, and such that the paper is substantially incinerated in the container.

18 Claims, 1 Drawing Sheet

METHOD FOR DISPOSING OF PAPER IN AN ASPHALT PLANT

BACKGROUND OF THE INVENTION

1. Field of the Invention

The invention relates to asphalt plants. More particularly, the invention relates to a method for disposing of paper in an asphalt plant.

2. Discussion of Prior Art

Asphalt paving of the type used for roadway surfacing typically includes stone aggregate and asphalt cement (hereinafter "asphalt"). As used herein, "asphalt" includes those mixtures of primarily hydrocarbon materials commonly referred to as "asphalt" and other binder materials suitable for producing asphalt paving or similar paving when mixed with stone aggregate. As used herein, "stone aggregate" includes any aggregate material suitable for use in asphalt paving or similar paving for roadway surfacing. Asphalt paving is produced in an asphalt plant, typically by heating and thus drying the stone aggregate, and then mixing the hot stone aggregate with liquid asphalt. Typically, asphalt paving includes about 5% of asphalt and about 95% of stone aggregate.

U.S. Pat. No. 5,273,355 relates to an aggregate dryer and soil incinerator. The apparatus is adapted to heat and dry stone aggregate useful in the production of asphalt paving, and also is adapted to incinerate contaminated soil. The apparatus comprises a rotary dryer for heating and drying the stone aggregate, and a separate rotary incinerator for incinerating the soil.

SUMMARY OF THE INVENTION

The invention provides a method for disposing of paper by incinerating the paper in an asphalt plant and incorporating the ash into the asphalt paving.

The invention provides a method for disposing of paper by incinerating the paper in an asphalt plant, such that incineration of the paper contributes thermal energy for producing asphalt paving.

More particularly, the invention provides an asphalt plant including feed bins for providing stone aggregate and a container, such as a rotary dryer, for drying and heating the stone aggregate. The asphalt plant also includes a burner for providing thermal energy to dry and heat the stone aggregate in the dryer. The burner includes a supply of burner fuel and a supply of burner air and produces a flame. The flame is directed into the dryer for supplying thermal energy to dry and heat the asphalt aggregate in the dryer. The burner is positioned at one end of the dryer, such that atmospheric air is supplied to the flame and interacts with the flame to produce a hot airstream which passes through the dryer. The asphalt plant also includes an air filter which collects particles from the hot airstream as a filter residue. Preferably, the filter residue is incorporated into the asphalt paving. The asphalt plant also includes a supply of asphalt and a mixer for mixing the stone aggregate and asphalt to produce asphalt paving.

The asphalt plant also includes a stream of oxygen or air, such as compressed air. The stream of air is introduced into the flame. The asphalt plant includes a supply of paper, such as comminuted paper, which is introduced into the stream of air. The comminuted paper is mixed with and entrained in the stream of compressed air. The stream of air provides a large or excess amount of oxygen in the immediate vicinity of the comminuted paper. The comminuted paper thus is substantially incinerated in the flame and contributes thermal energy for heating and drying the stone aggregate and producing the asphalt paving. A small proportion of ash is produced by incineration of the comminuted paper and incorporated into the asphalt paving.

Other features of and advantages of the invention will become apparent to those skilled in the art upon review of the following detailed description, claims, and drawings.

Figure 1:
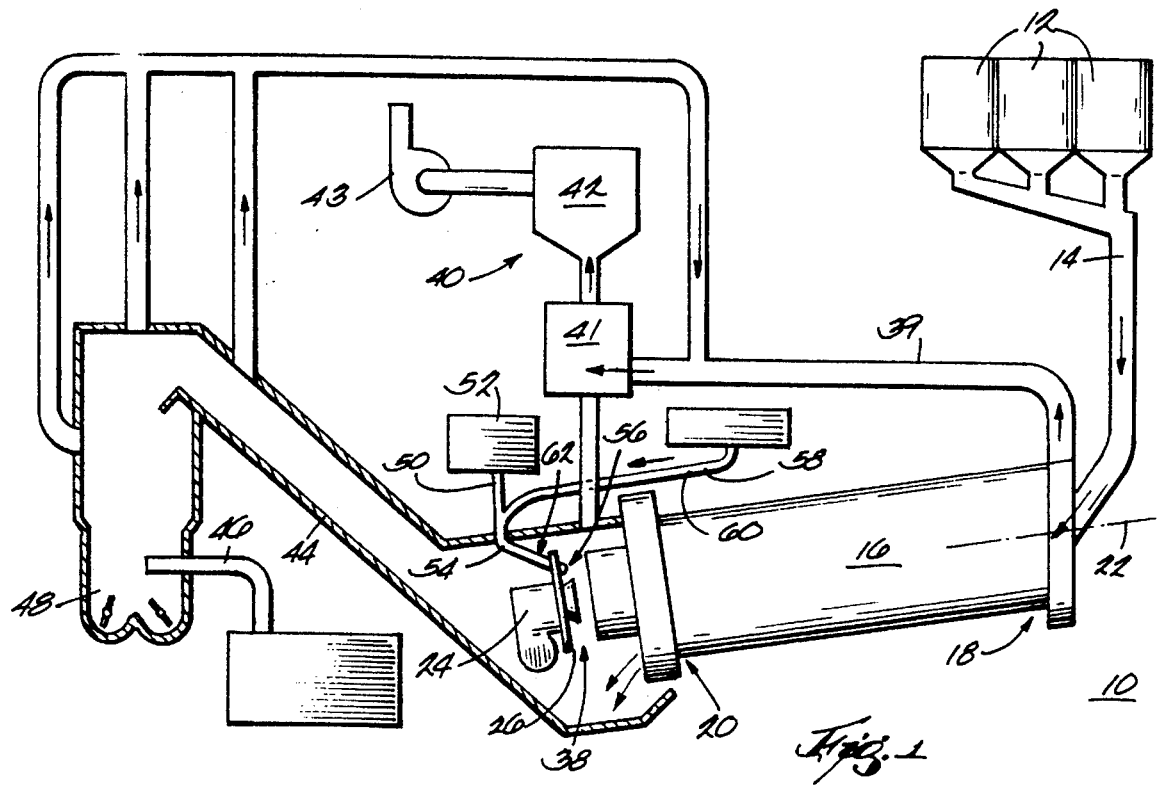
FIG. 1 is a schematic diagram of an asphalt plant including various features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is an asphalt plant 10 for producing asphalt paving and which is adapted for disposing of paper. Although another suitable type of asphalt plant, such as a drum mix plant, can be used, in the illustrated embodiment the asphalt plant 10 is a batch plant.

The asphalt plant 10 includes feed bins 12 for providing stone aggregate. In the illustrated embodiment, the feed bins 12 are adapted to provide three types, or any mixture thereof, of stone aggregate. A conveyer or feed conduit 14 communicates with the feed bins 12. In the illustrated embodiment, the proportion of stone aggregate is not appreciably reduced by the amount of ash incorporated into the asphalt. In one embodiment, the proportion of stone aggregate in the asphalt paving may be slightly less than the typical proportion (about 95%), being slightly reduced from the typical proportion by an amount roughly equal to the ash produced upon incineration of the paper and incorporated into the asphalt paving.

The asphalt plant 10 includes a drum or container 16 for drying and heating the stone aggregate. In the illustrated embodiment, the container 16 is a rotary dryer. The dryer 16 includes an inlet end 18 and an outlet end 20 spaced from the inlet end 18. The dryer 16 rotates about a longitudinal axis 22. The feed conduit 14 communicates with the inlet end 18 of the dryer 16 for delivering the stone aggregate from the feed bins 12 to the rotary dryer 16. The dryer 16 has therein flights which lift and advance the stone aggregate as the dryer rotates. The stone aggregate thus moves through the dryer 16 from the inlet end 18 to the outlet end 20.

Figure 2:
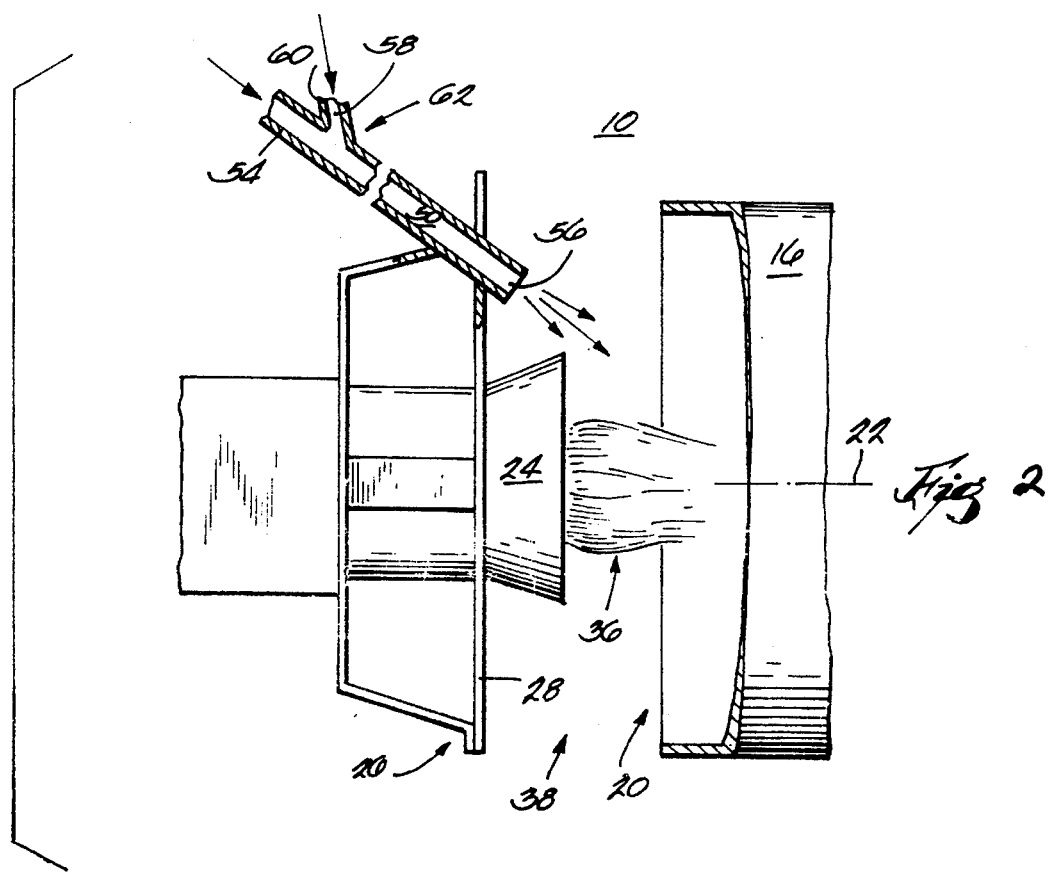
FIG. 2 is enlarged view of the dryer and burner illustrated in FIG. 1.

The asphalt plant 10 includes a burner 24 for providing thermal energy to dry and heat the stone aggregate in the dryer 16. A support structure 26 supports the burner 24. In the illustrated embodiment, the support structure 26 includes a wall 28. The wall 28 surrounds the burner 24 and extends perpendicularly to the longitudinal axis 22. The burner 24 includes a supply of burner fuel, which in the illustrated embodiment is oil. The amount of burner fuel typically is in the range of several hundred gallons of oil per hour. The burner 24 also includes a supply of burner air. The amount of burner air typically is in the range of several thousands of cubic feet per minute. As best shown in FIG. 2, the burner 34 produces a flame 36. The burner flame 36 typically produces several million BTU's per hour of thermal energy.

In the illustrated embodiment, the burner 24 is positioned at the outlet end 20 of the dryer 16. The flame 36 is directed into the outlet end 20 of the dryer 16 for supplying thermal energy to dry and heat the stone aggregate in the dryer 16. In the illustrated embodiment, the burner 24 and wall 28 are spaced slightly from the outlet end 20 of the dryer 16, such that an opening 38 is defined between the burner 24 and wall 28 and the outlet end 20. In another embodiment, the burner and wall are not spaced from the end of the dryer, so that the burner is enclosed. Ambient or atmospheric air is supplied to the dryer 16 and flame 36 through the opening 38. The flame 36 interacts with the atmospheric air to produce a hot airstream which passes through the dryer 16 from the outlet end 20 to the inlet end 18. The hot airstream passes out of the dryer 16 at the inlet end 18. The amount of atmospheric air supplied to the dryer typically is several tens of thousands of cubic feet per minute.

The asphalt plant 10 includes an air conduit 39 which communicates with the dryer 16 and a baghouse or dust collector 40. The hot airstream flows from the dryer 16, through the conduit 39 and into the dust collector 40. The dust collector 40 includes a primary air filter 41 and a secondary air filter 42. The dust collector 40 also includes an exhaust fan 43 for drawing the hot airstream through the air filters 41 and 42 and expelling the filtered airstream into the atmosphere. As the hot airstream passes through the primary and secondary air filters 41 and 42, suspended particles are collected as a filter residue. Preferably, the filter residue is incorporated into the asphalt paving, such as by periodically mixing the filter residue into the asphalt paving in the pugmill.

The asphalt plant 10 includes a secondary conveyer or conduit 44. In the illustrated embodiment, the secondary conduit 44 is a bucket elevator. The secondary conduit 44 communicates with the outlet end 20 of the dryer 16 to remove dried and heated stone aggregate from the dryer 16.

The asphalt plant 10 includes a supply 46 of asphalt cement or asphalt. In the illustrated embodiment, the asphalt is a liquid mixture of primarily hydrocarbon materials. In different embodiments, the asphalt may be another binder material suitable for producing asphalt paving or similar paving when mixed with stone aggregate. In the illustrated embodiment, the proportion of asphalt in the asphalt paving is about 5%.

The asphalt plant 10 includes a mixer 48 for mixing the stone aggregate and asphalt to produce asphalt paving. Although any suitable mixer may be used, in the illustrated embodiment the mixer 48 is a pugmill. In another embodiment, such as a drum-mix asphalt plant, the container for drying the aggregate includes the mixer. The secondary conduit 44 communicates with the pugmill 48 to provide the dried and heated stone aggregate from the dryer 16 to the pugmill 48. The supply 46 of asphalt communicates with the pugmill 48 to provide liquid asphalt to the pugmill 48. The pugmill 48 mixes the stone aggregate and asphalt to produce asphalt paving. The asphalt paving is delivered by gravity to a truck or storage container (not shown) for transportation to a remote site for incorporation into a roadway surface.

The asphalt plant 10 also includes a supply or stream 50 of oxygen or air. In the illustrated embodiment, the stream 50 is pressurized or compressed air. The stream 50 of compressed air is provided from an air compressor 52. A conduit 54 delivers the compressed air from the air compressor 52 to the dryer 16. In the illustrated embodiment, the conduit 54 is a flexible hose. The conduit 54 has an outlet 56. In the illustrated embodiment, the outlet 56 is a steel nozzle or fitting mounted in the wall 28. The outlet 56 directs the stream 50 of compressed air leaving the conduit 54 at an angle relative to the longitudinal axis 22. The outlet 56 thus introduces the stream 50 of compressed air into the flame 36. In another embodiment, the asphalt plant may include a plurality of conduits and outlets for directing a plurality of streams of air into the flame. In another embodiment, the stream of compressed air is introduced in close proximity to the flame 36. Although different proportions of air can be used, in the illustrated embodiment, the stream 50 of compressed air is small in comparison to the amount of burner air and atmospheric air supplied to the burner and dryer. For example, in one embodiment about 150 cubic feet per minute of compressed air was supplied to a dryer using several thousand cubic feet per minute of burner air and several tens of thousands of cubic feet per minute of atmospheric air.

The asphalt plant 10 further includes a supply 58 of paper. The paper can be in any suitable form, and in the illustrated embodiment the paper is comminuted. More particularly, in the illustrated embodiment the paper is comminuted by shredding. The comminuted or shredded paper can be of any suitable size, varying over a broad range. In one embodiment, the shredded paper has an average width in the range of about 0.25 inches to about 0.5 inches and a length in the range of about 2 inches to about 14 inches or more. In one embodiment, the comminuted paper has an average width in the range of about 0.5 inches to about 2 inches and a length in the range of about 0.5 inches to about 2 inches. The supply 58 of comminuted paper is connected to the conduit 54 to introduce the comminuted paper into the stream 50 of compressed air. In the illustrated embodiment, the supply 58 of comminuted paper includes a flexible hose or conduit 60 which is connected to the conduit 54 by a Y-fitting 62. The comminuted paper is drawn or introduced into the stream 50 of compressed air, such that the comminuted paper is mixed with and entrained in the stream 50 of compressed air. Thus, the stream 50 of compressed air having therein the entrained comminuted paper is introduced into the flame 36. The compressed air 50 provides a large or excess amount of oxygen in the immediate vicinity of the comminuted paper. Therefore, the comminuted paper is substantially incinerated in the flame 36. The comminuted paper thus contributes thermal energy for heating and drying the stone aggregate and producing the asphalt paving. Although the proportion of paper introduced into the dryer 16 can vary over a broad range, such as from less than 1% to about 10% or more, in the illustrated embodiment the proportion of paper introduced into the dryer is about 2% to about 3%, based upon the total weight of the asphalt paving.

As used herein "paper" includes paper and suitable non-hazardous incinerable materials. As used herein, "incinerable" material means a material which is combustible in the presence of air or oxygen under the temperature and pressure conditions useful for producing asphalt paving, or which is otherwise suitably degraded by incineration or other thermal degradation processes under the temperature and pressure conditions useful for producing asphalt paving. As used herein, "non-hazardous" materials includes materials which upon incineration do not produce gases, liquids or solids which are classified under applicable law as hazardous to human health or the environment. As used herein, "non-hazardous" materials may also include materials which when incinerated can produce gases, liquids or solids which are classified under applicable law as hazardous to human health or the environment when present in air, water, soil or other media in concentrations exceeding levels established by law, but which are not, in fact, produced in concentrations which exceed these established levels in the relevant media. As used herein, "non-hazardous" materials may also include materials which when incinerated can produce gases, liquids or solids which are classified under applicable law as hazardous to human health or the environment when present in air, water, soil or other media in concentrations exceeding the levels established by law, and which are produced in concentrations which exceed the established levels in the relevant media, but which can be shown by scientific theory or testing to be intermediate products or to be products which are themselves degraded or destroyed by incineration or which are immobilized by incorporation into asphalt paving. Non-hazardous incinerable materials may include, for example, materials such as wood chips, cardboard, plastics, food waste, and household refuse from which hazardous materials and non-incinerable materials (such as most metals) have been removed. Non-hazardous incinerable materials may also include, for example, mixtures of non-hazardous incinerable materials and other materials, such as gypsum, which can be suitably incorporated into asphalt paving.

A relatively small amount or proportion of ash is produced by incineration of the comminuted paper and incorporated into the asphalt paving. The amount of ash is greatly reduced from the proportion of paper introduced into the dryer 16. A portion of the ash will fall into and be mixed with the stone aggregate in the dryer 16, and thus will be incorporated into the asphalt paving with the stone aggregate. A portion of the ash may be carried out of the dryer 16 in the hot airstream to the filter 40, and will be incorporated into the filter residue. Preferably, the filter residue is mixed into the asphalt paving, and thus, this portion of the ash will be incorporated into the asphalt paving. The relatively small proportion of ash incorporated into the asphalt paving does not substantially adversely affect the utility of the asphalt paving for roadway surfacing. In the illustrated embodiment, the asphalt paving includes less than about 4% to about 7% of fine dust or ash, and thus has a suitably high proportion of air voids. In the illustrated embodiment, "fine" dust or ash means size P-200 or smaller. In other embodiments, the amount of size P-200 dust or ash may be adjusted to provide a suitable proportion of air voids in the asphalt paving. Typically, asphalt paving must include at least about 3% of air voids in order to prevent rutting under traffic.

The invention thus provides a method for disposing of paper in an asphalt plant as set forth above. The method includes the step of providing a container, such as a dryer, for heating the stone aggregate, and providing in the container a burner for producing a flame to provide thermal energy for heating the stone aggregate in the container. A stream of air is introduced into the burner flame. Paper is introduced into and entrained in the stream of air, and the stream of air having therein the entrained paper is introduced into the burner flame. The stream of air provides oxygen in the immediate vicinity of the paper, and the paper is incinerated in the container. Incineration of the paper produces ash which is incorporated into asphalt paving produced by the asphalt plant. Incineration of the paper thus contributes thermal energy for producing the asphalt paving.

The invention provides a method for producing asphalt paving including stone aggregate, asphalt and a small proportion of ash from paper incinerated in the asphalt plant. The asphalt paving is produced as set forth above.

The invention also provides asphalt paving including stone aggregate, asphalt and a small proportion of ash from paper incinerated in the asphalt plant. The asphalt paving is produced as set forth above.

Ash resulting from incineration of the paper in the asphalt plant may serve as a so-called "extender" for the asphalt paving. As used herein, "extender" means that the amount of asphalt paving produced from a given amount of stone aggregate and asphalt is increased slightly by the presence of the ash. It is believed that the ash acts as an "extender" with regard to the amount of asphalt required to produce the asphalt paving.

It is advantageous that paper is disposed in the asphalt plant, and resulting ash is incorporated into the asphalt paving.

It is a further advantage that incineration of the paper contributes thermal energy for producing the asphalt paving, and reduces the amount of burner fuel necessary for producing the asphalt paving.

Various features of the invention are set forth in the following claims.

What is claimed is:

1. A method for disposing of paper in an asphalt plant, said method comprising the steps of:
    a) heating stone aggregate in a container, the container having a burner for producing a flame to provide thermal energy for heating the stone aggregate;
    b) providing a stream of air into the burner flame;
    c) introducing the paper into said stream of air, such that the paper is entrained in said stream of air, such that said stream of air having therein the entrained paper is introduced into the burner flame, and such that the paper is substantially incinerated in the container to form ash, the ash being mixed with the heated stone aggregate in the container.

2. The method as set forth in claim 1 and wherein said stream of air is compressed air.

3. The method as set forth in claim 1 and wherein the ash is incorporated into asphalt paving produced by the asphalt plant.

4. The method as set forth in claim 1 and wherein incineration of the paper contributes thermal energy for producing the asphalt paving.

5. The method as set forth in claim 1 and wherein the burner includes a supply of burner air other than said stream of air.

6. The method as set forth in claim 1 and wherein the container is a rotatable dryer.

7. The method as set forth in claim 1 and wherein the paper is incinerable non-hazardous material.

8. A method for producing asphalt paving in an asphalt plant, said method comprising the steps of:
    a) providing a dryer for heating stone aggregate, providing in the dryer a burner for producing a flame to provide thermal energy for heating the stone aggregate in the dryer;
    b) providing a stream of air into the burner flame;
    c) introducing paper into said stream of air, the paper being entrained in said stream of air, said stream of air having therein the entrained paper being introduced into the burner flame, the paper being substantially incinerated in the dryer and producing ash; and
    d) mixing the stone aggregate and ash with asphalt to produce asphalt paving.

9. The method as set forth in claim 8 and wherein said stream of air is compressed air.

10. The method as set forth in claim 8 and wherein incineration of the paper contributes thermal energy for producing the asphalt paving.

11. The method as set forth in claim 8 and wherein the burner includes a supply of burner air other than said stream of air.

12. The method as set forth in claim 8 and wherein the paper is incinerable non-hazardous material.

13. An apparatus for producing asphalt paving, said apparatus comprising:
   a) an asphalt plant including means for heating stone aggregate, said means for heating stone aggregate including a burner for producing a flame to provide thermal energy for heating the stone aggregate;
   b) means for supplying air connected to said means for heating stone aggregate for providing a stream of air into the burner flame;
   c) a supply of paper connected to said stream of air for introducing paper into the stream of air, such that the paper is entrained in the stream of air and introduced into said burner flame, and such that the paper is substantially incinerated in said means for heating stone aggregate and produces ash; and
   d) means in communication with said means for heating stone aggregate for mixing the stone aggregate and ash with asphalt to produce asphalt paving.

14. The apparatus as set forth in claim 14 and wherein said means for supplying air is compressed air.

15. The apparatus as set forth in claim 13 and wherein incineration of the paper contributes thermal energy for producing the asphalt paving.

16. The apparatus as set forth in claim 13 and wherein the burner includes a supply of burner air other than said stream of air.

17. The apparatus as set forth in claim 13 and wherein the paper is incinerable non-hazardous material.

18. The apparatus as set forth in claim 13 and wherein the means for heating stone aggregate is a dryer.

* * * * *